United States Patent
Ishimura et al.

(10) Patent No.: US 8,655,116 B2
(45) Date of Patent: Feb. 18, 2014

(54) OPTICAL MODULATOR

(75) Inventors: Eitaro Ishimura, Tokyo (JP); Kazuhisa Takagi, Tokyo (JP); Keisuke Matsumoto, Tokyo (JP); Takeshi Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 13/156,376

(22) Filed: Jun. 9, 2011

(65) Prior Publication Data

US 2012/0087614 A1    Apr. 12, 2012

(30) Foreign Application Priority Data

Oct. 6, 2010 (JP) ................................. 2010-226707

(51) Int. Cl.
  *G02F 1/035*  (2006.01)
  *G02B 26/00*  (2006.01)
  *G02F 1/01*   (2006.01)

(52) U.S. Cl.
  USPC .............................................. 385/2; 359/238

(58) Field of Classification Search
  USPC ........................................................ 385/1–3
  See application file for complete search history.

(56) References Cited

U.S. PATENT DOCUMENTS

| 7,002,731 B2 | 2/2006 | Mitomi et al. |
| 7,263,244 B2 | 8/2007 | Tanaka et al. |
| 7,345,803 B2 * | 3/2008 | Nakajima et al. ............. 359/237 |
| 7,558,444 B2 | 7/2009 | Shimizu et al. |
| 2004/0001242 A1 * | 1/2004 | Shigeta et al. ................ 359/240 |

FOREIGN PATENT DOCUMENTS

| JP | 7-221509 A | 8/1995 |
| JP | 11-183858 A | 7/1999 |
| JP | 2004-170931 A | 6/2004 |
| JP | 2007-10942 A | 1/2007 |
| WO | WO 2005/096077 A1 | 3/2005 |
| WO | WO 2010/001986 A1 | 7/2009 |

OTHER PUBLICATIONS

"InP—InGaAsP High-Speed Traveling-Wave Electroabsorption Modulators with Integrated Termination Resistors" by Irmscher et al, IEEE Photonics Technology Letters, vol. 14, No. 7, pp. 923-925, Jul. 2002.*

"Ultrahigh-Speed Traveling-Wave Electroabsorption Modulator—Design and Analysis" by Li et al, IEEE Transactions on Microwave Theory and Techniques, vol. 47, No. 7, pp. 1177-1183, Jul. 1999.*

"Traveling-wave Electroabsorption Modulators" by Zhang, PhD Thesis, Apr. 1999.*

(Continued)

*Primary Examiner* — Ryan Lepisto
*Assistant Examiner* — Robert Tavlykaev
(74) *Attorney, Agent, or Firm* — Leydig, Voit & Mayer, Ltd.

(57) ABSTRACT

An optical modulator includes: a semiconductor chip; a waveguide in the semiconductor chip; a traveling wave electrode including an input portion and an output portion, to which a signal is applied for modulating light passing through the waveguide; a power supply line connected to the input portion via a first wire; and a termination resistor connected to the output portion via a second wire. Capacitance between the output portion and a grounding point is larger than capacitance between the input portion and the grounding point.

6 Claims, 15 Drawing Sheets

(56) References Cited

OTHER PUBLICATIONS

"40 Gbit/s silicon optical modulator for high-speed applications" by Liao et al, Electronics Letters, vol. 43, No. 22, Oct. 25, 2007.*

"Widely Tunable Separate Absorption and Modulation Wavelength Converter With Integrated Microwave Termination" by Dummer et al, Journal of Lightwave Technology, vol. 26, No. 8, pp. 938-944, Apr. 15, 2008.*

* cited by examiner

OPTICAL MODULATOR

FIELD OF THE INVENTION

The present invention relates to a traveling wave optical modulator operating at a high velocity. More specifically, the present invention relates to an optical modulator that can sufficiently spread modulation bandwidth.

BACKGROUND ART

In a traveling wave optical modulator, when light passes through the arm, modulation-signal superimposed microwaves also pass through the arm at the same velocity. At this time, the electric field of the microwaves is applied to the arm, and the light is modulated. Comparing with lumped-constant optical modulators, the traveling wave optical modulator can spread modulation bandwidth without the limitation by the capacity of the waveguide.

As described, in the traveling wave optical modulator, the waveguide is used as the microwave-transmitting line. For the propagation of a basic mode, the optimal thickness of the core layer and the width of the waveguide are about 0.2 μm and about 2 μm, respectively. In this case, however, the impedance of the waveguide is as low as 35Ω, causing mismatch of impedance with the impedance of the power supply line (normally 50Ω). As a result, the light inputted in the optical modulator is reflected or attenuated, and the modulation bandwidth is narrowed.

In order to elevate the impedance for microwave, it is required to thicken the core layer and to narrow the width of the waveguide. However, if the core layer is thick, the propagation mode of the light is not the basic mode, but is the higher mode. Then, the extinction ratio is deteriorated and the operating voltage is elevated so as not to operate as an optical modulator. Furthermore, if the width of the high-mesa waveguide is narrow, the light is not propagated, and loss in enlarged. As described above, although one waveguide is used for both light and microwave, the optimal sizes for both are different.

Also in a generally used traveling wave Mach-Zehnder optical modulator composed of lithium niobate ($LiNbO_3$), since the permittivity of the material is low, the impedance of the waveguide can be 50Ω. Further in the lithium niobate modulator, in order to widen the modulation bandwidth, it is proposed for example that the termination resistance is lowered to lower the output impedance, or a stub is connected to the termination resistor (for example, refer to Japanese Patent Laid-Open No. 2004-170931, Japanese Patent Laid-Open No. 2007-010942, WO 2005/096077, Japanese Patent Laid-Open No. 11-183858, Japanese Patent Laid-Open No. 07-221509, and WO 2010/001986).

SUMMARY OF THE INVENTION

In a traveling wave Mach-Zehnder optical modulator composed of a semiconductor, since the permittivity of the material is high, the impedance of the waveguide becomes 50Ω or lower. In addition, the capacity for the unit length of the waveguide is high. Therefore, even if the termination resistance was lowered, the modulation bandwidth could not be widened. Also, even if a stub was connected to the termination resistor, the modulation bandwidth could not be widened. In view of the above-described problems, an object of the present invention is to provide an optical modulator that can sufficiently spread modulation bandwidth.

According to the present invention, an optical modulator comprises: a semiconductor chip; a waveguide in the semiconductor chip; a traveling wave electrode including an input portion and an output portion, and modulating a light passing through the waveguide; a power supply line connected to the input portion via a first wire; and a termination resistor connected to the output portion via a second wire, wherein an electric capacity between the output portion and a grounding point is larger than an electric capacity between the input portion and the grounding point.

The present invention makes it possible to sufficiently spread modulation bandwidth.

Other and further objects, features and advantages of the invention will appear more fully from the following description.

DETAILED DESCRIPTION OF THE PREFERRED EMBODIMENTS

An optical modulator according to the embodiments of the present invention will be described with reference to the drawings. The same components will be denoted by the same symbols, and the repeated description thereof may be omitted.

First Embodiment

Figure 1:
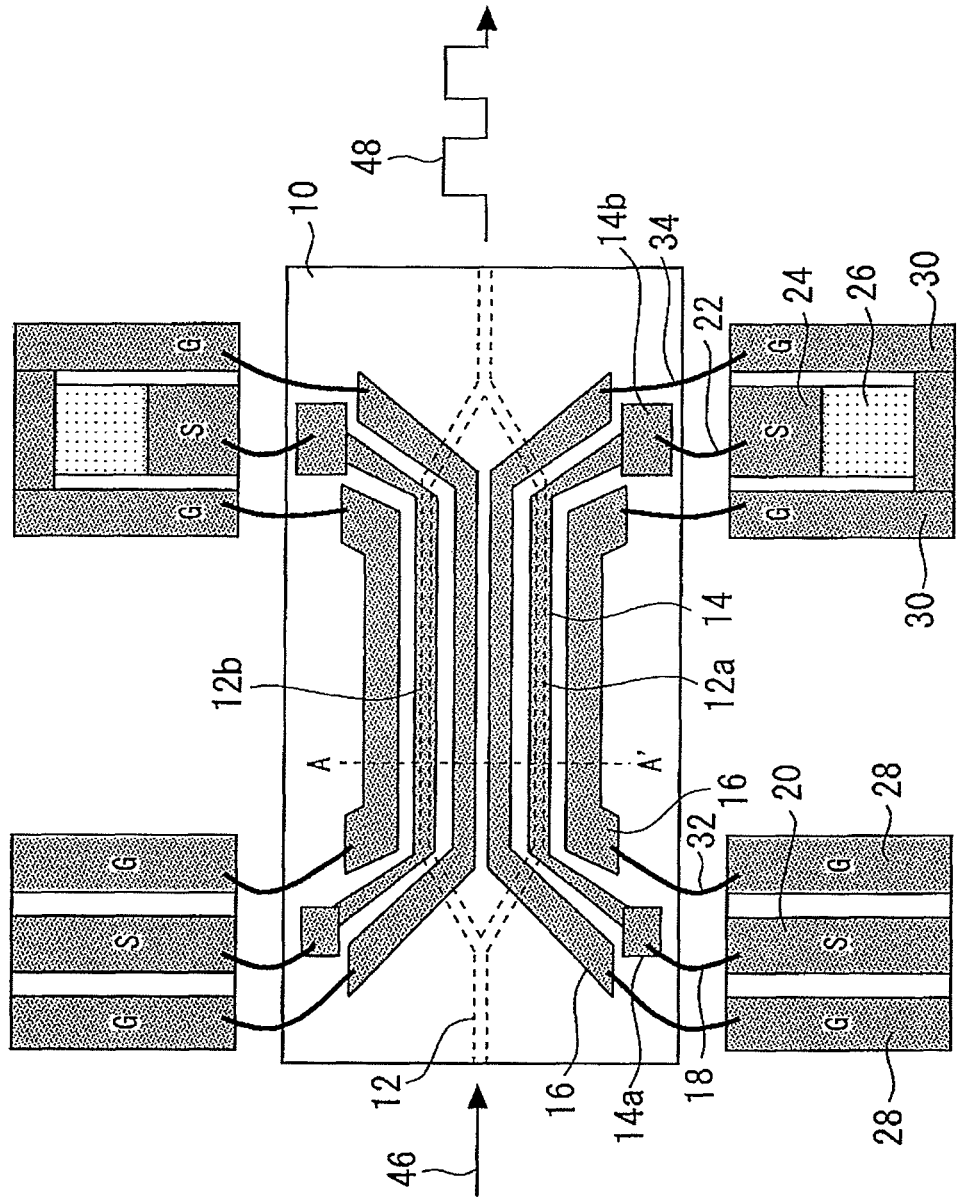
FIG. 1 is a top view showing an optical modulator according to the first embodiment.

FIG. 1 is a top view showing an optical modulator according to the first embodiment. The optical modulator is a traveling wave Mach-Zehnder optical modulator composed of semiconductors.

A waveguide 12 having arms 12a and 12b is formed in a semiconductor chip 10. A traveling wave electrode 14 is formed on the arm 12a side on the semiconductor chip 10. Grounded ground lines 16 are separately formed in the vicinity of the traveling wave electrode 14. The traveling wave electrode 14 and ground lines 16 are composed of metals such as gold plating.

A power supply line 20 is connected to the input portion 14a of the traveling wave electrode 14 via a first wire 18. A termination resistor 26 is connected to the output portion 14b of the traveling wave electrode 14 via a second wire 22 and a terminating line 24. The impedance of the power supply line 20 is 50Ω, and the resistance of the termination resistor 26 is 25Ω. The traveling wave electrode 14 generates the traveling wave electric field corresponding to electric signals inputted from the power supply line 20, and modulates the light passing through the arm 12a of the waveguide 12 by this electric field.

A ground line 28 is formed on each side of the power supply line 20, and a ground line 30 is formed on each side of the terminating line 24. The ground line 28 is connected to the input side of the ground line 16 via a wire 32, and the ground line 30 is connected to the output side of the ground line 16 via a wire 34.

The area of the bonding pad of the output portion 14b is larger than the area of the bonding pad of the input portion 14a. Therefore, the electric capacity between the output portion 14b and the grounding point is larger than the electric capacity between the input portion 14a and the grounding point. In the same manner, a traveling wave electrode, a ground line, a power supply line, a terminating resistor, and the like are formed in the arm 12b side.

Figure 2:
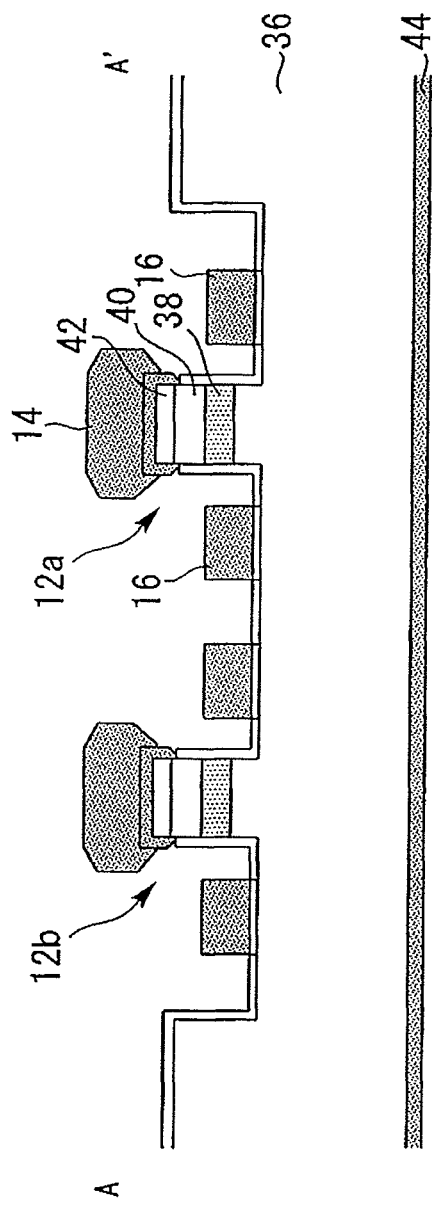
FIG. 2 is a sectional diagram taken along the line A-A' in FIG. 1.

FIG. 2 is a sectional diagram taken along the line A-A' in FIG. 1. On an n-type InP substrate 36, a core layer 38, a p-type InP layer 40, and a contact layer 42 composed of InGaAs, InP or the like are sequentially laminated. Etching is performed from the contact layer 42 to the middle of the n-type InP substrate 36 to form a high-mesa waveguide.

The traveling wave electrode 14 is connected to the contact layer 42 on the ridge. The ground lines 16 are formed on the n-type InP substrate 36 of the both sides of the traveling wave electrode 14. A back side electrode 44 is ohmically connected to the back side of the n-type InP substrate 36.

A core layer 38 is an undoped multiple quantum well, and is composed of a material having a higher refraction index than the p-type InP layer 40, such as InGaAsP and AlGaInAs. The thickness of the core layer 38 is 0.1 to 0.6 μm, and the width of the high-mesa waveguide is 1 to 3 μm.

Next, the operation of the optical modulator according to the present embodiment will be described. The input light 46 such as laser beam enters in the waveguide 12, and is branched into two light beams to propagate in two arms 12a and 12b of the waveguide 12. Thereafter, the two light beams are combined into one light beam, and outputted as the output light 48.

When voltages having different intensities are applied to two arms 12a and 12b, the refractive indices of the two becomes different values. When the difference of these refractive indices is Δn, the length to which the voltages are applied in the arms 12a and 12b is L, and the wavelength of the light propagated in the arms is λ, difference Δφ occurs in the phases of light beams having passed through the arms 12a and 12b.

$$\Delta\phi = \Delta n \cdot L \cdot 2\pi/\lambda \quad (1)$$

When the phase difference Δφ of the light is nπ (n is 0 or an even number), the light beams propagated in the two arms 12a and 12b are combined and intensified. On the other hand, when the phase difference Δφ is kπ (k is an odd number), the light beams propagated in the two arms 12a and 12b are combined and negated. Therefore, the intensity of light can be modulated depending on voltages applied to the two arms 12a and 12b. In addition, when a modulation voltage is applied so that the phase difference Δφ is made to reciprocate between the states of nπ and (n+2)π, the phase of the light can be modulated.

Figure 3:
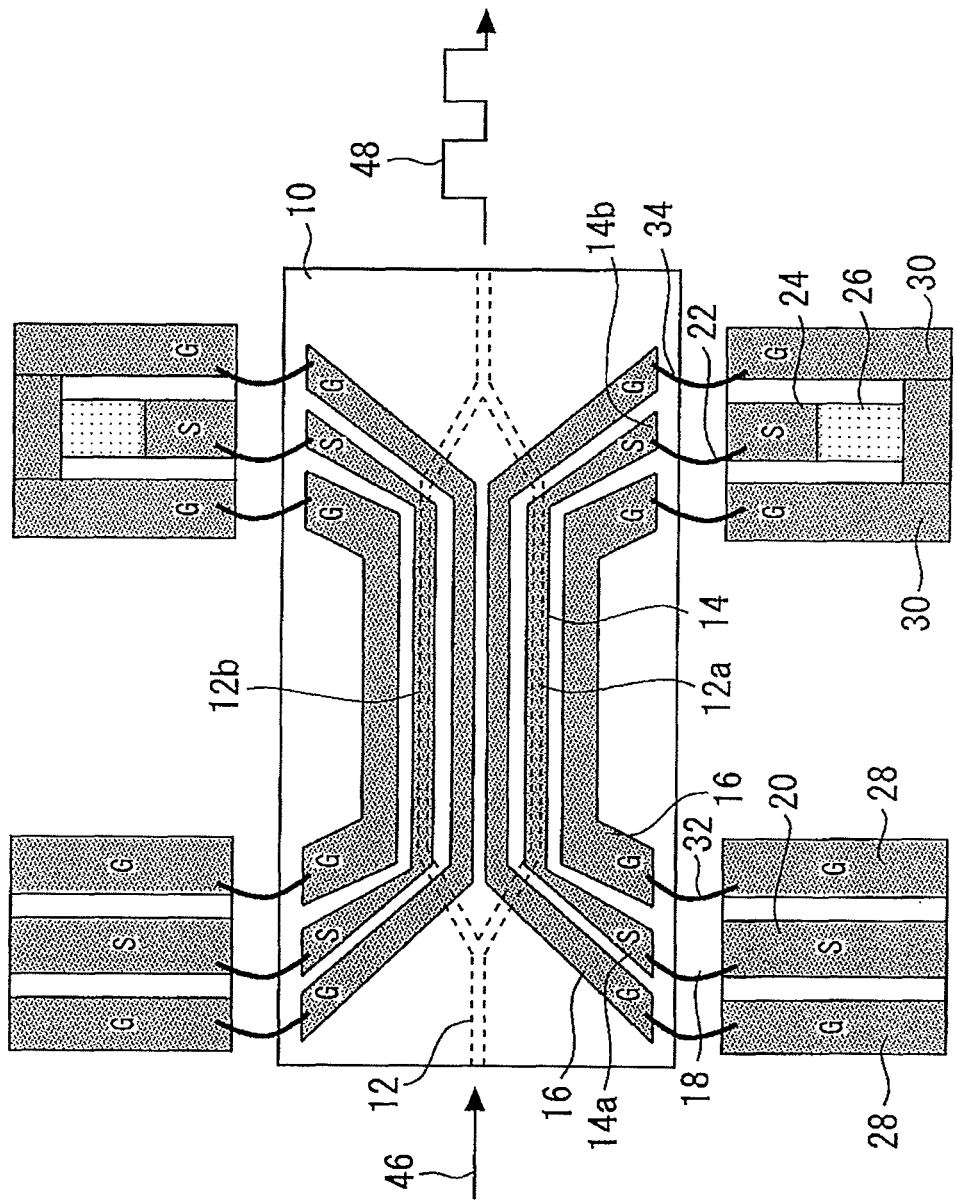
FIG. 3 is a top view showing an optical modulator according to the first comparative example.

Next, the effect of the present embodiment will be described by comparing with comparative examples. FIG. 3 is a top view showing an optical modulator according to the first comparative example. In the first comparative example, different from the first embodiment, the input portion 14a has the same area as the area of the output portion 14b. Therefore, the electric capacity between the output portion 14b and the grounding point is identical to the electric capacity between the input portion 14a and the grounding point.

Figure 4:
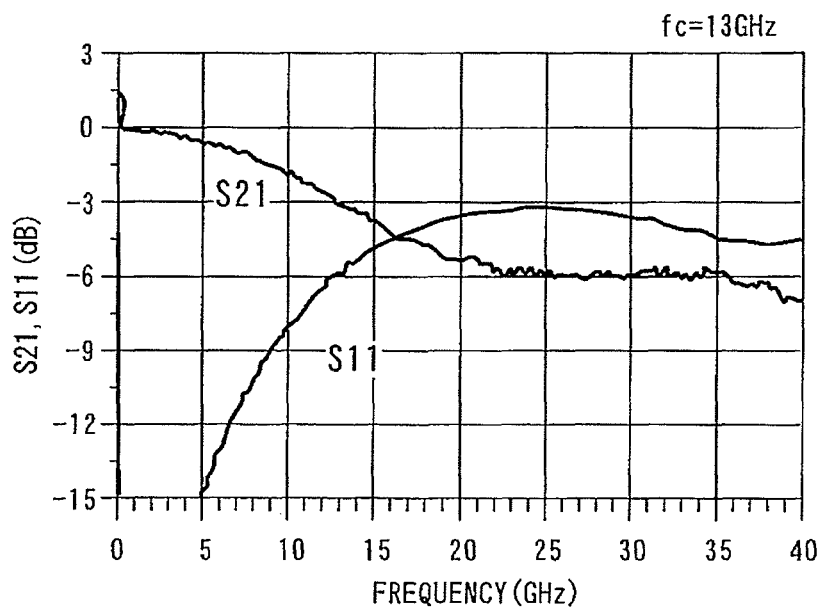
FIGS. 4 and 5 are diagrams showing the measured values of the transmission characteristic S21 and the reflection characteristic S11 of an optical modulator according to the first comparative example.
Figure 5:
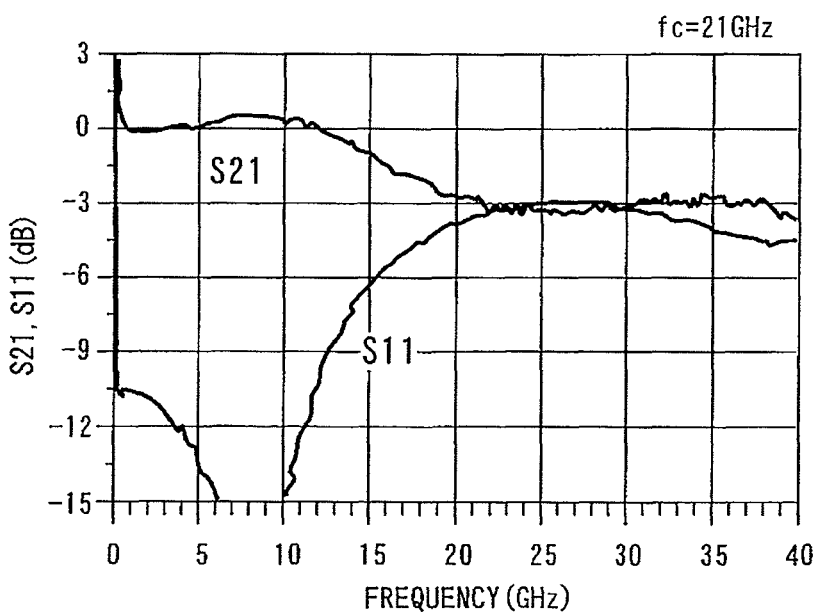

FIGS. 4 and 5 are diagrams showing the measured values of the transmission characteristic S21 and the reflection characteristic S11 of an optical modulator according to the first comparative example. Input-output impedance is shown when the termination resistance is 50Ω in FIG. 4; and when the termination resistance is 25Ω in FIG. 5. The width of the high-mesa waveguide is 1.8 μm, the thickness of the core layer is 0.35 μm, and the impedance of the waveguide 12 (the impedance of the traveling wave electrode 14) is about 35Ω.

Here, as the transmission band of electricity is wider, the modulation bandwidth of the light modulated by electricity is also wider. Normally, when the group velocity of microwaves transmitted in the waveguide agrees with the propagation velocity of the light, the modulation bandwidth is maximized. Especially, when the width of the arm of the Mach-Zehnder optical modulator is 2 mm or narrower, the transmission band of electricity and the modulation bandwidth of light are almost agreed little depending on the group velocity of microwaves and the propagation velocity of the light.

As seen from FIGS. 4 and 5, the band fc is 13 GHz when the termination resistance is 50Ω, and is 21 GHz when the termination resistance is 25Ω. Here, when input-output impedance is 50Ω the waveguide 12 having a low impedance of 35Ω becomes electric capacity and the band is limited. On the other hand, when input impedance is 50Ω and output impedance is 25Ω, the impedance 35Ω of the waveguide 12 becomes approximately an intermediate value. Therefore, the impedance behaves as if it coordinates, and the modulation bandwidth can be enlarged.

If the input-output impedance is made to be 35Ω, it is completely coordinates with the impedance of the waveguide 12. However, due to the influence of the modulation driver or the electricity supply circuit, it is difficult to make the input impedance 35Ω. When the impedance (input impedance) of the power supply line 20 is 35Ω, the electric signals feel the inductance of the first wire 18 to be high, and electro-reflection in the power supply line 20 increases. Therefore, it is required that the impedance of the power supply line 20 is made to be nearly 50Ω.

As described above, to enlarge the modulation bandwidth, the impedance is set to satisfy equation (2).

$$Z_{in} > Z_{wg} > R_o \quad (2)$$

where Zin denotes the impedance of the power supply line 20 (input impedance), Zwg denotes the impedance of the waveguide 12, and Ro denotes the resistance of the termination resistor 26.

Furthermore, it is preferable to set the impedance so as to satisfy equation (3)

$$Zwg \approx (Zin+Ro)/2 \qquad (3)$$

However, by the inductance L of the second wire 22, the impedance $jL\omega$ of the second wire 22 to a high frequency (for example, 20 GHz) is elevated to higher than the resistance of the termination resistor 26. Therefore, in the first comparative example, since the impedance $jL\omega$ of the second wire 22 is added to the output impedance even if the resistance Ro of the termination resistor 26 is reduced, the reflection of electricity in the output portion increases, transmission characteristics are deteriorated, and the modulation bandwidth is narrowed.

Figure 6:
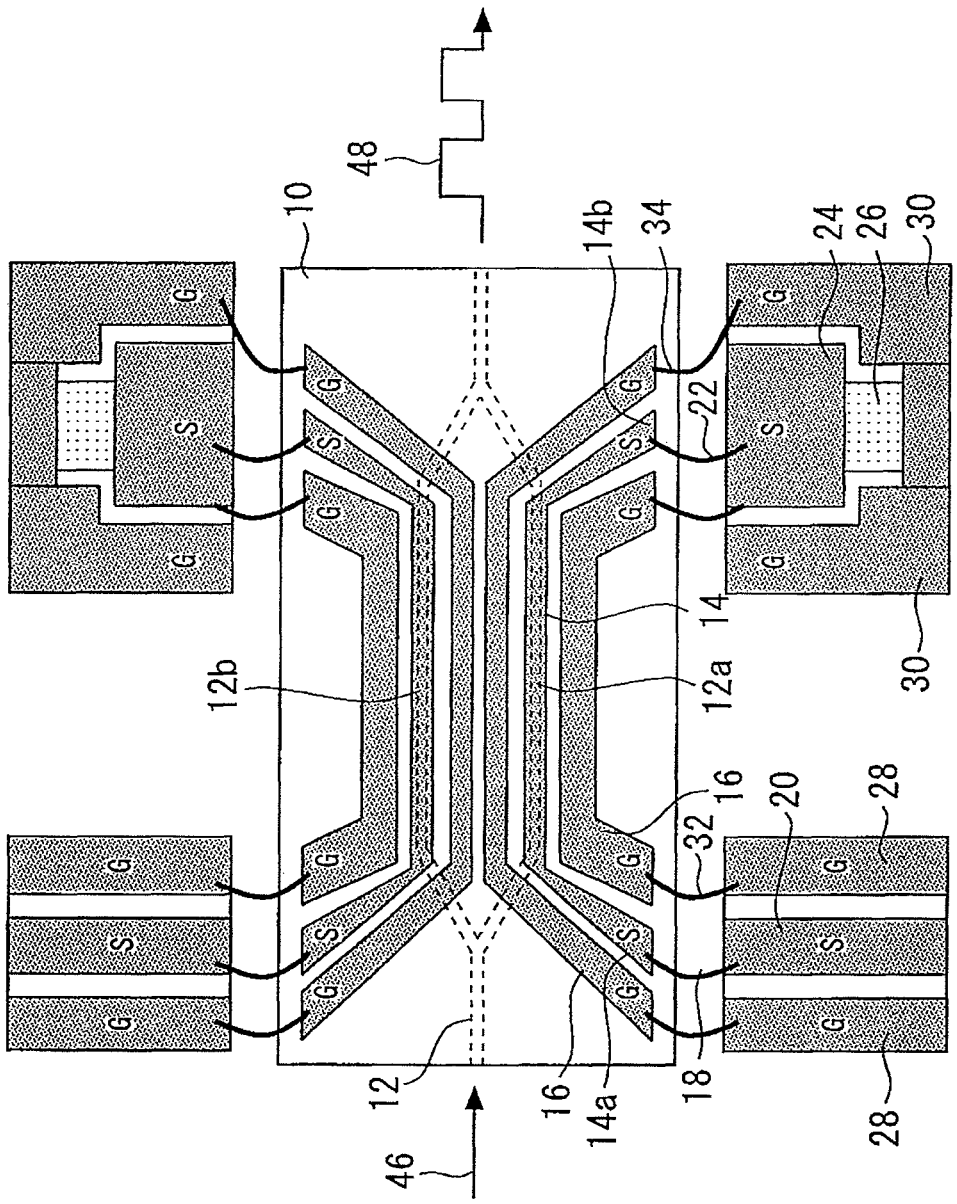
FIG. 6 is a top view showing an optical modulator according to the second comparative example.
Figure 7:
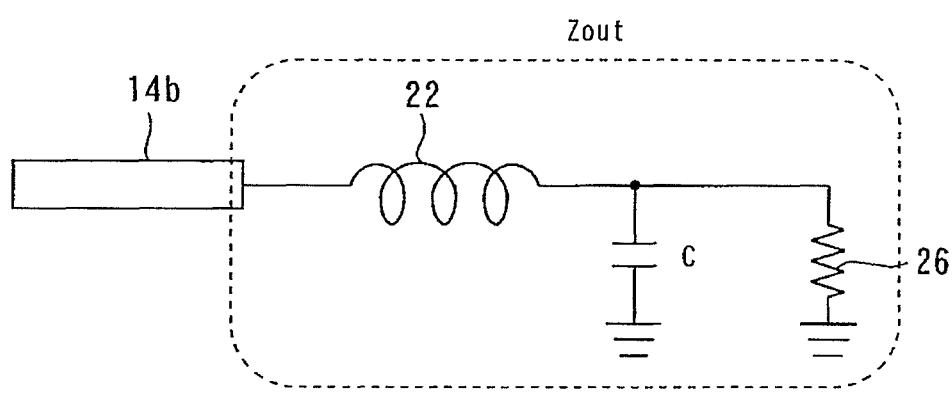
FIG. 7 is a circuit diagram showing a practical output impedance of the second comparative example.

FIG. 6 is a top view showing an optical modulator according to the second comparative example. In the second comparative example, the terminating line 24 is enlarged to make it function as a stub. FIG. 7 is a circuit diagram showing a practical output impedance of the second comparative example. In the second comparative example, the electric capacity C of the stub is connected to the second wire 22 in series. Therefore, when the impedance $jL\omega$ of the second wire 22 is enlarged (e.g. 25Ω), how much the electric capacity C of the stub is enlarged, the effective output impedance Zout cannot be lowered (e.g. 25Ω).

Figure 8:
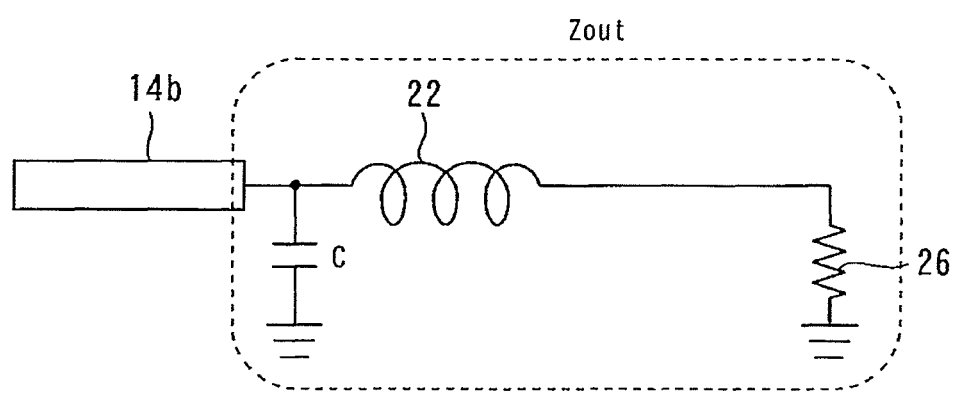
FIG. 8 is a circuit diagram showing a practical output impedance of the first embodiment.

FIG. 8 is a circuit diagram showing a practical output impedance of the first embodiment. In the present embodiment, the electric capacity C is connected to the second wire 22 in parallel. Therefore, when the electric capacity C is enlarged, the impedance ($1/jc\omega$) thereof is lowered, and the elevation of the impedance $jL\omega$ (e.g. ≥25Ω) of the second wire 22 is cancelled, and the effective output impedance Zout can be lowered (e.g. ≤25Ω). Thereby, since the reflection and transmission of electricity of the output portion 14b can be improved, the modulation bandwidth can be sufficiently enlarged.

Figure 9:
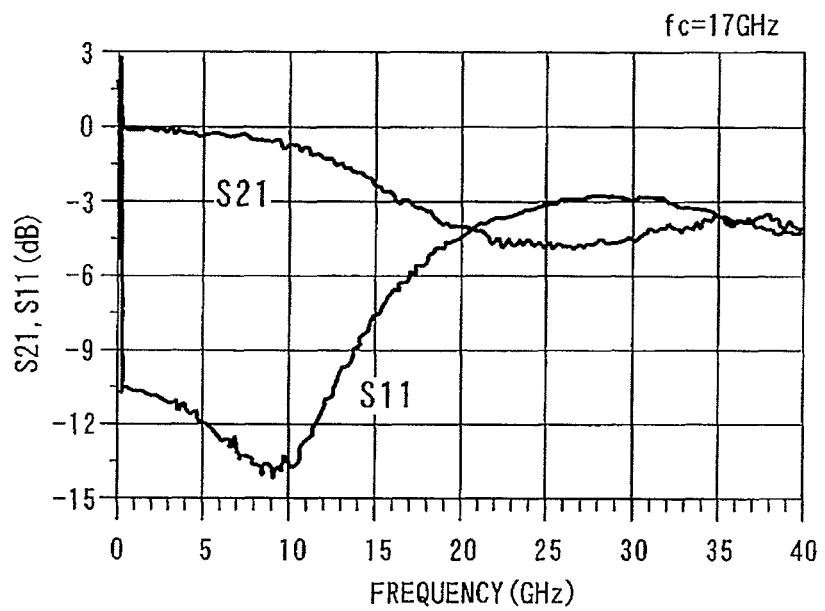
FIG. 9 is a diagram showing the measured values of the transmission characteristics S21 and reflective characteristics S11 of the optical modulator according to the second comparative example.
Figure 10:
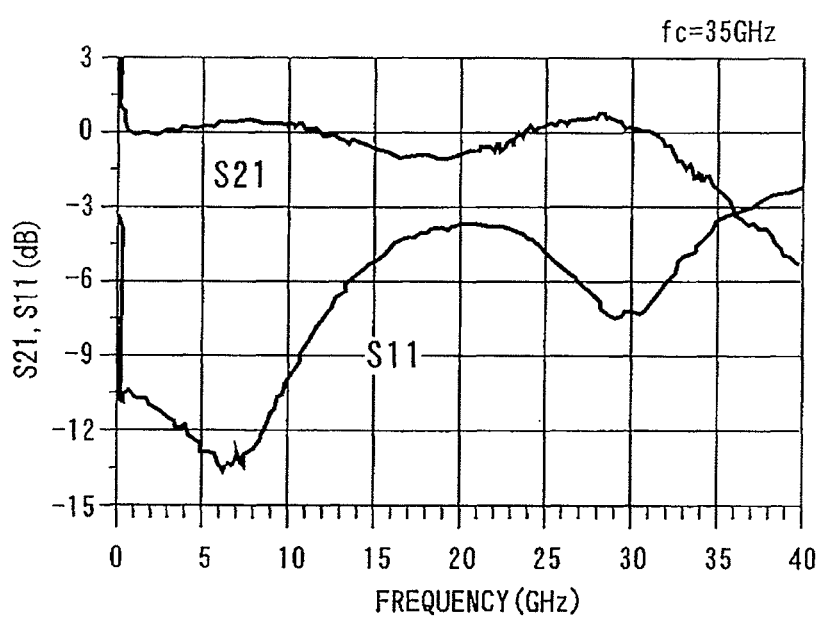
FIG. 10 is a diagram showing the transmission characteristics S21 of the optical modulator according to the first embodiment and the measured values of the reflective characteristics S11.

FIG. 9 is a diagram showing the measured values of the transmission characteristics S21 and reflective characteristics S11 of the optical modulator according to the second comparative example. FIG. 10 is a diagram showing the transmission characteristics S21 of the optical modulator according to the first embodiment and the measured values of the reflective characteristics S11. Obviously, the modulation bandwidth of the first embodiment is enlarged than the modulation bandwidth of the second comparative example.

In addition, as the impedance of the output portion 14b of the traveling wave electrode 14 is lower, difference with the impedance $jL\omega$ of the second wire 22 is enlarged, and the impedance easily receives the effect thereof. Therefore, when Equation (4) is satisfied, the above-described effect appears strongly.

$$Z1>Z2 \text{ and } Zwg>Z2 \qquad (4)$$

where Z1 denotes the impedance of the input portion 14a of the traveling wave electrode 14, and Z2 denotes the impedance of the output portion 14b of the traveling wave electrode 14.

Second Embodiment

Figure 11:
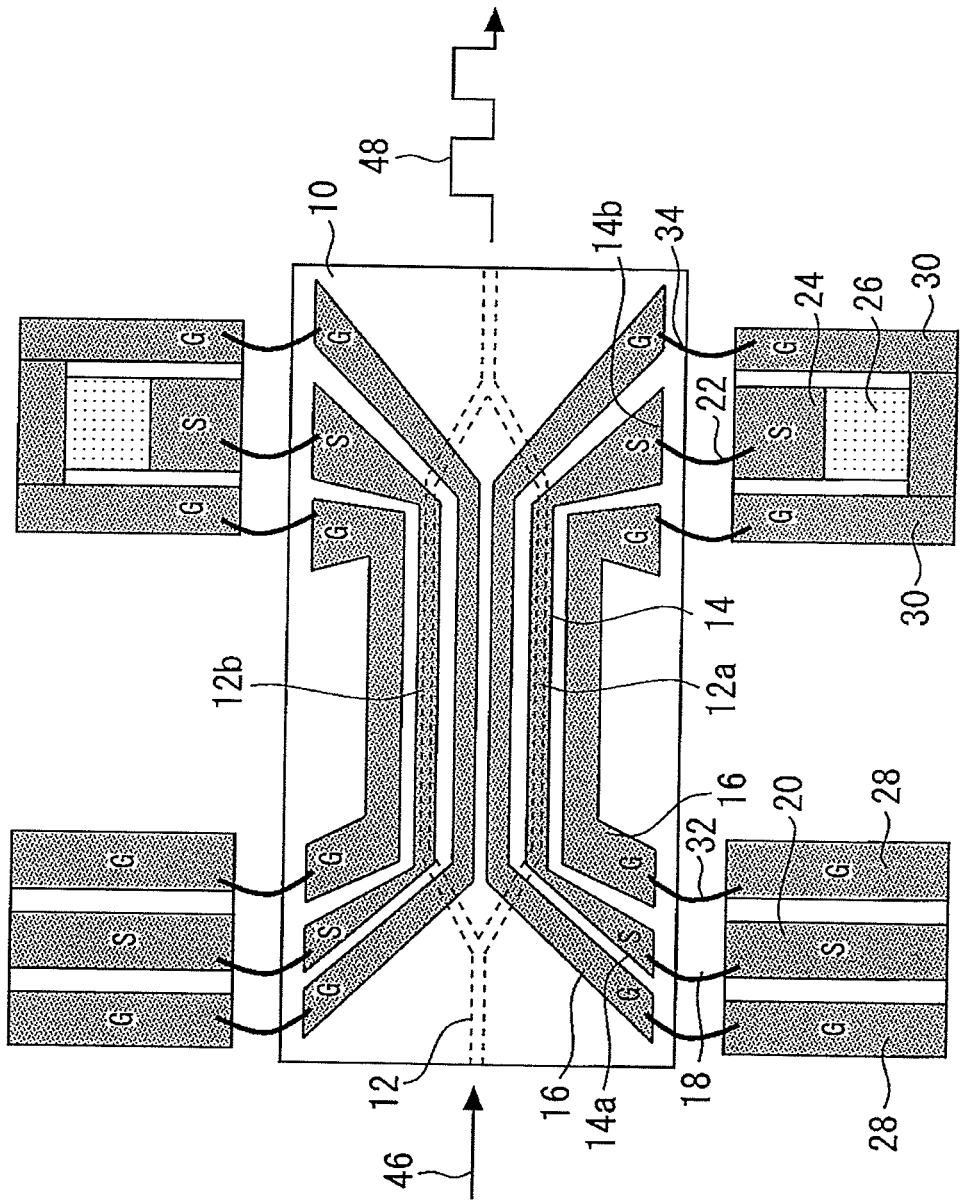
FIG. 11 is a top view showing an optical modulator according to the second embodiment.

FIG. 11 is a top view showing an optical modulator according to the second embodiment. The width of the output portion 14b of the traveling wave electrode 14 is significantly widened toward the output end so that the area of the output portion 14b is larger than the area of the input portion 14a. Therefore, the electric capacity between the output portion 14b and the grounding point is larger than the electric capacity between the input portion 14a and the grounding point. As a result, in the same manner as in the first embodiment, the modulation bandwidth can be sufficiently expanded.

Third Embodiment

Figure 12:
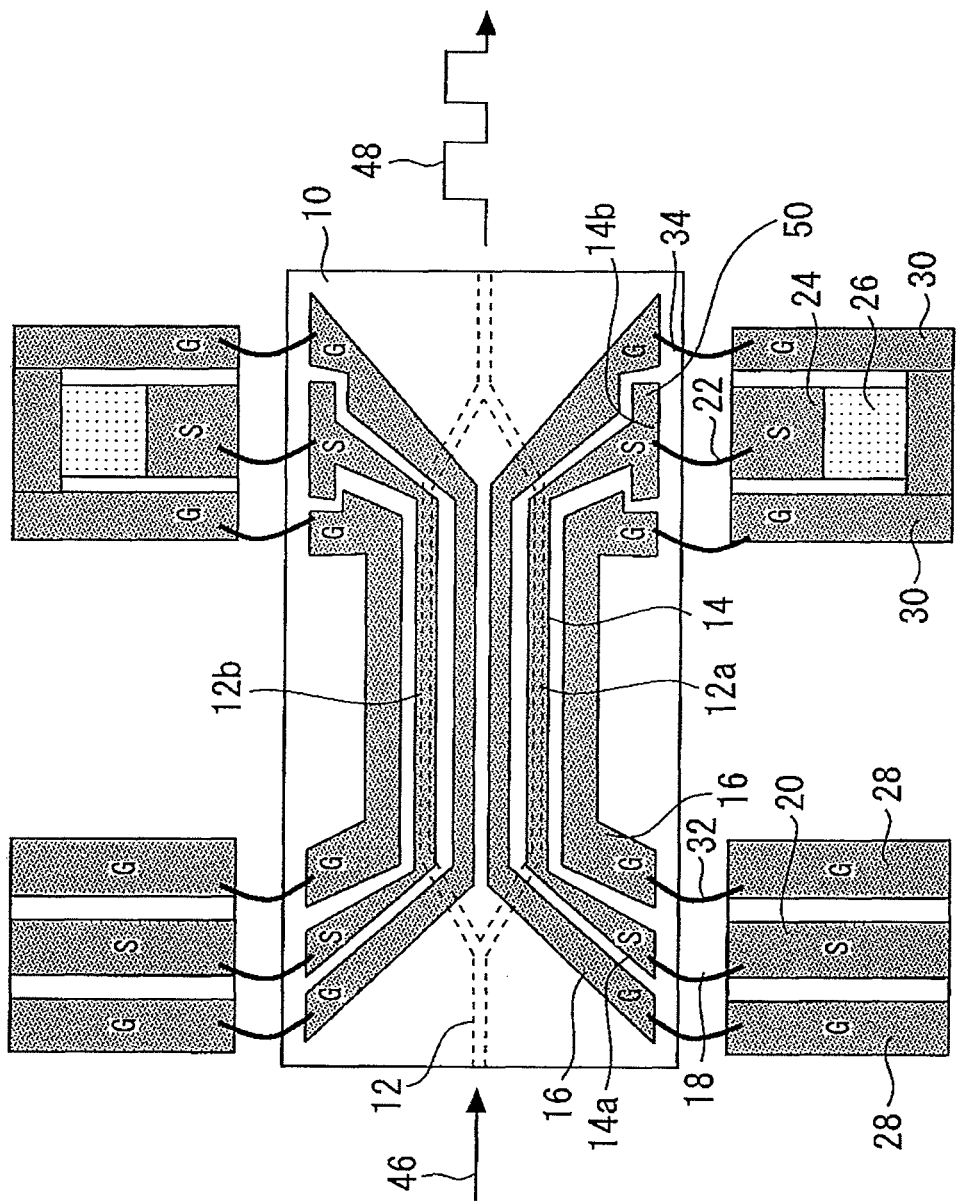
FIG. 12 is a top view showing an optical modulator according to the third embodiment.

FIG. 12 is a top view showing an optical modulator according to the third embodiment. The first stub 50 is connected to the output portion 14b. Therefore, the electric capacity between the output portion 14b and the grounding point is larger than the electric capacity between the input portion 14a and the grounding point. As a result, in the same manner as in the first embodiment, the modulation bandwidth can be sufficiently expanded.

Fourth Embodiment

Figure 13:
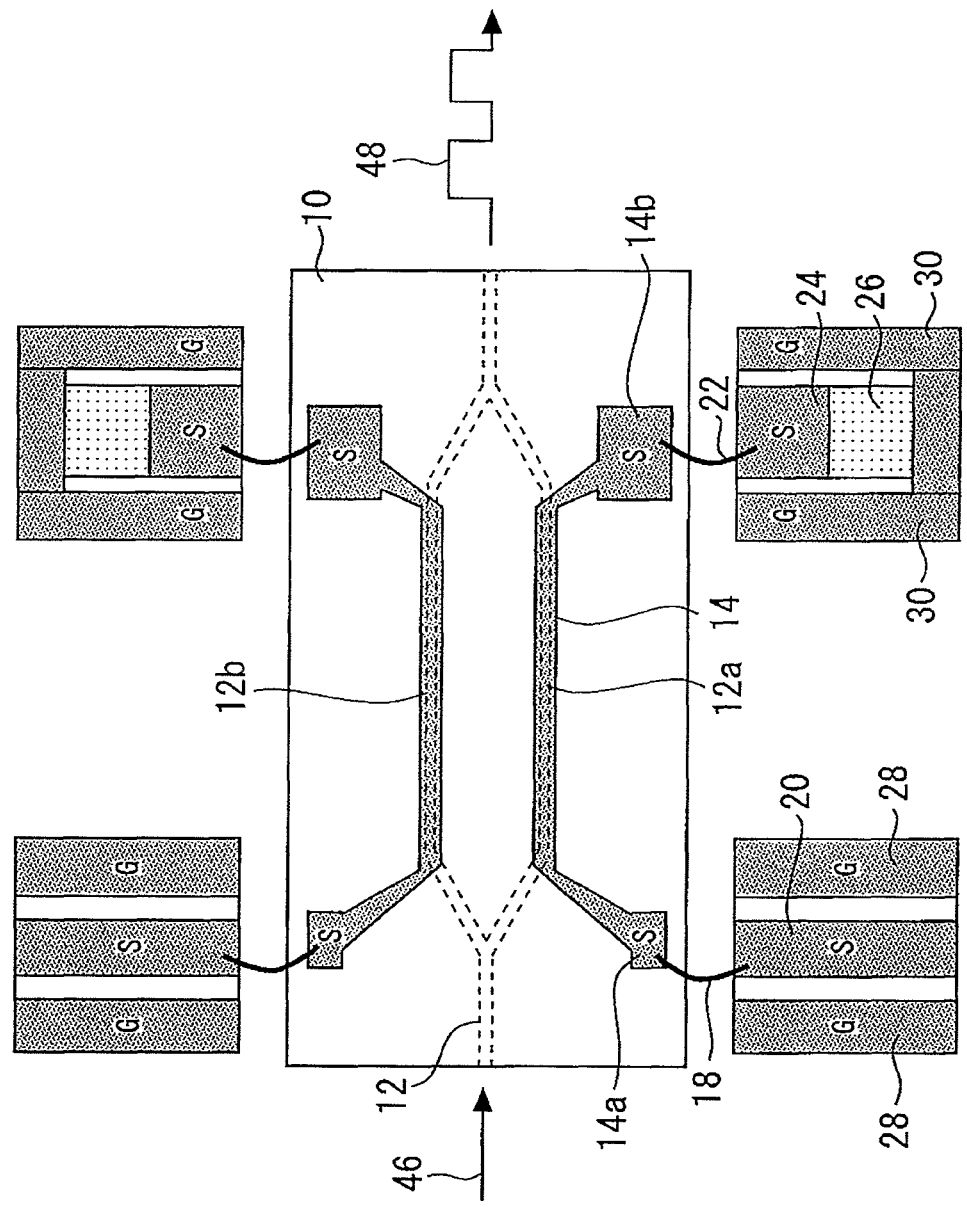
FIG. 13 is a top view showing an optical modulator according to the fourth embodiment.

FIG. 13 is a top view showing an optical modulator according to the fourth embodiment. The traveling wave electrode 14 is not the GSG electrode as in the first embodiment. The area of the bonding pad on the output portion 14b is three-times the area of the bonding pad on the input portion 14a. Thereby, the electric capacity between the output portion 14b and the grounding point is about 0.2 pF higher than the electric capacity between the input portion 14a and the grounding point. As a result, in the same manner as in the first embodiment, the modulation bandwidth can be sufficiently expanded. The electric capacity can be also elevated by connecting the output portion 14b to the p-n joint of the semiconductor chip 10.

Fifth Embodiment

Figure 14:
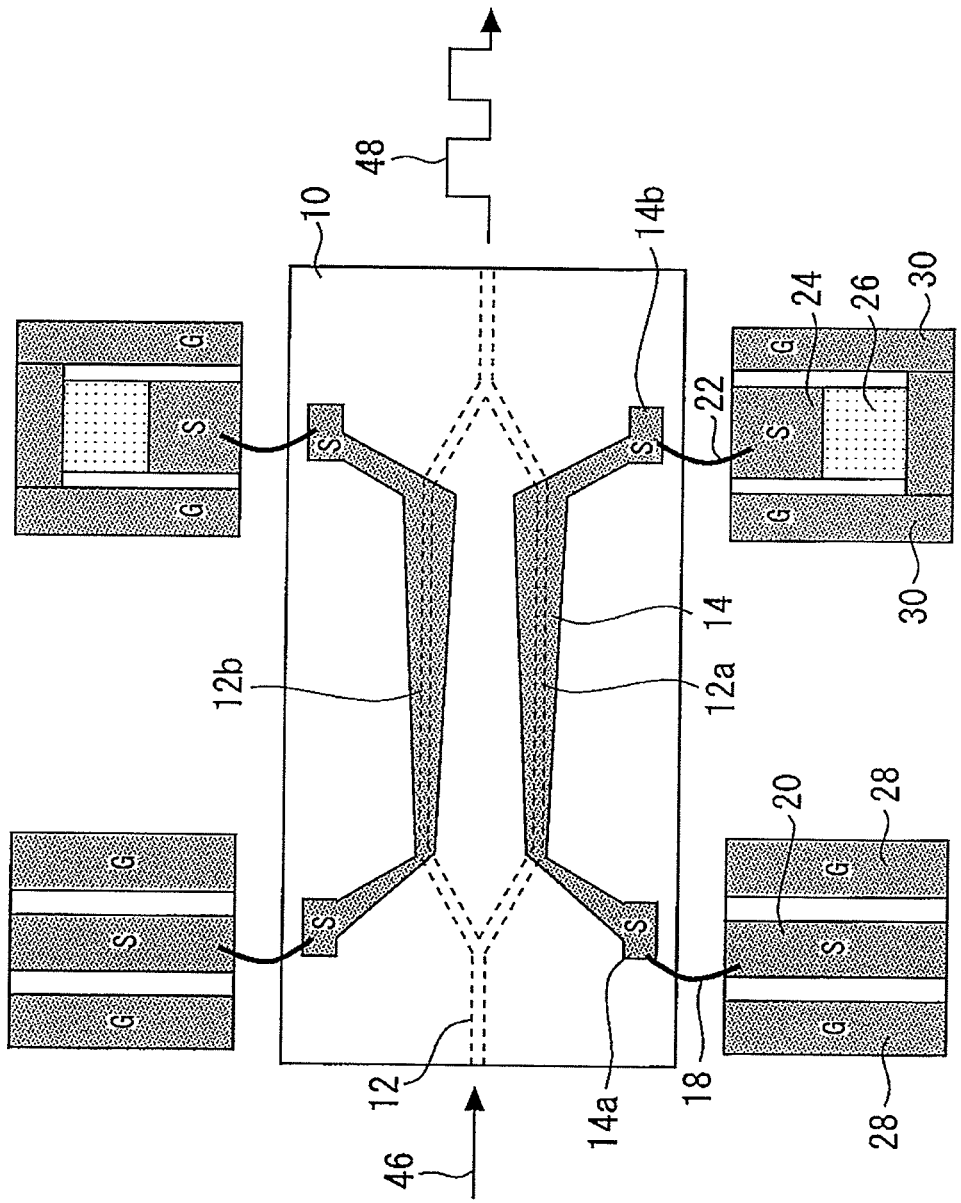
FIG. 14 is a top view showing an optical modulator according to the fifth embodiment.

FIG. 14 is a top view showing an optical modulator according to the fifth embodiment. The width of the traveling wave electrode 14 is widened from the input side toward the output side. Thereby, the transmission route capacity is widened toward the output side. As a result, in the same manner as in the first embodiment, the modulation bandwidth can be sufficiently expanded.

Figure 15:
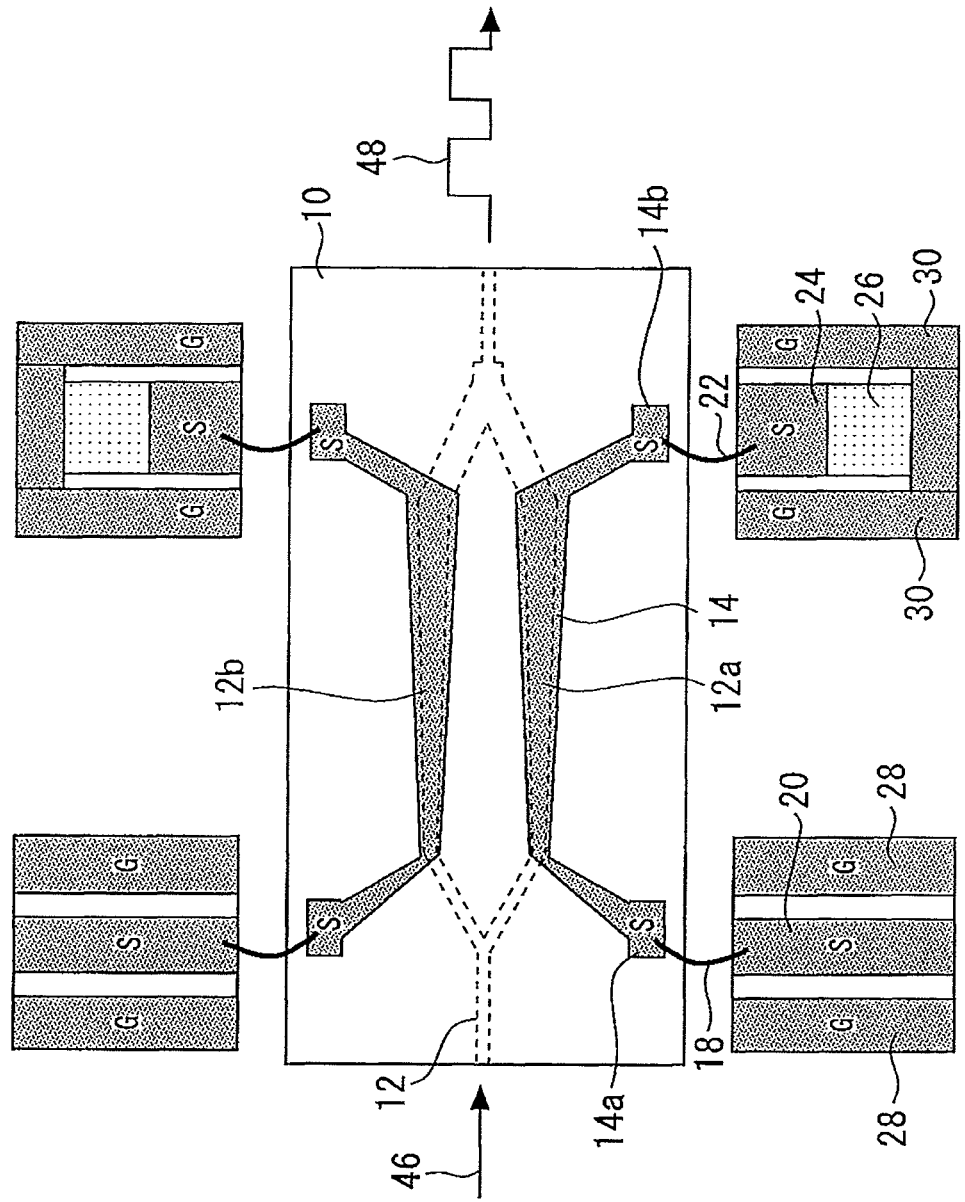

FIG. 15 is a top view showing a modified example of an optical modulator according to the fifth embodiment. The width of the waveguide 12 can be widened from the input side toward the output side to meet the change in the width of the traveling wave electrode 14.

Sixth Embodiment

Figure 16:
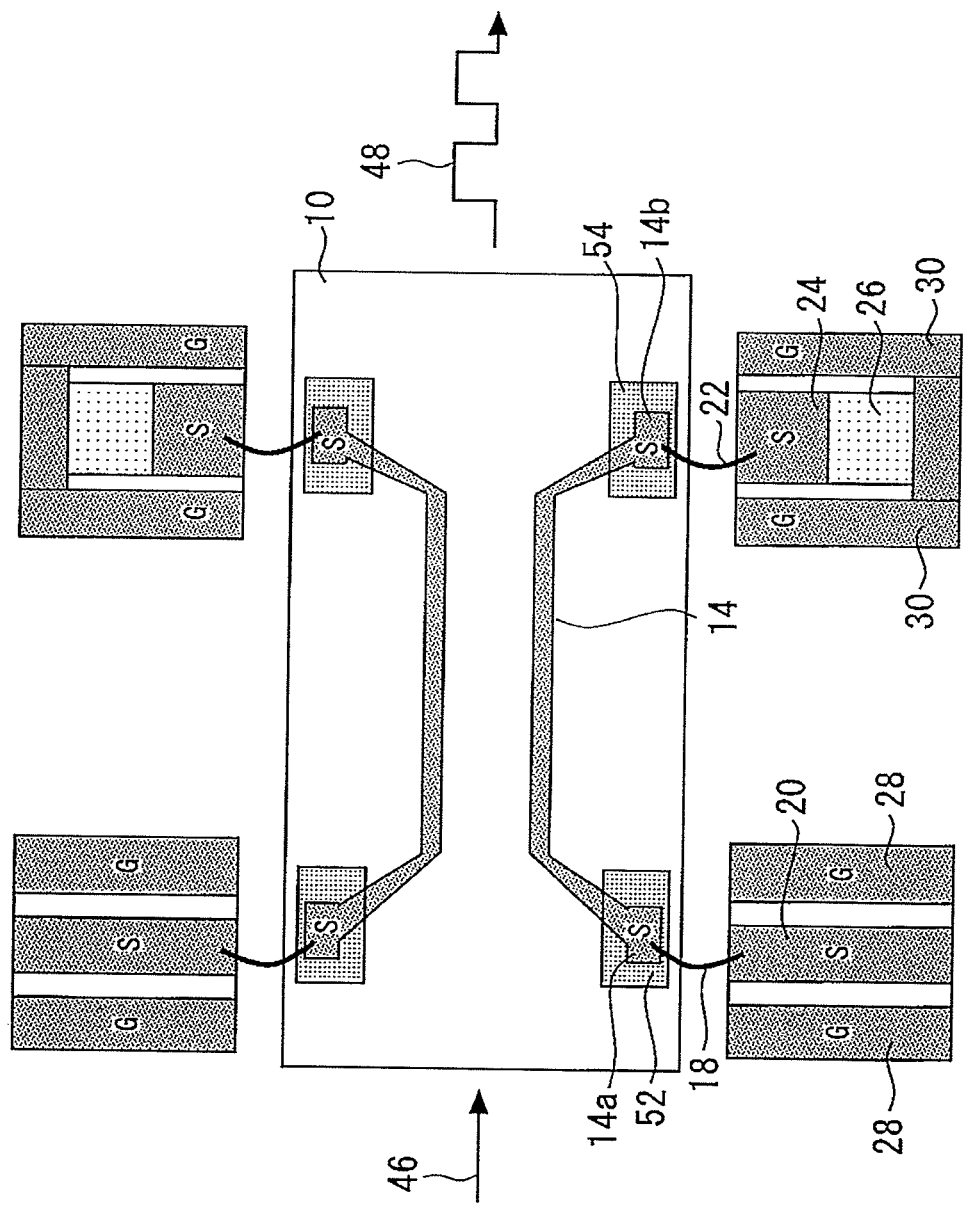
FIG. 16 is a top view showing an optical modulator according to the sixth embodiment.

FIG. 16 is a top view showing an optical modulator according to the sixth embodiment. First and second insulating films 52 and 54 are formed on the semiconductor chip 10. The input portion 14a of the traveling wave electrode 14 is formed on the first insulating film 52, and the output portion 14b is formed on the second insulating film 54. The second insulating film 54 is thinner than the first insulating film 52, and is about one-third. Thereby, the electric capacity between the output portion 14b and the grounding point is about 0.2 pF higher than the electric capacity between the input portion 14a and the grounding point. As a result, in the same manner as in the first embodiment, the modulation bandwidth can be sufficiently expanded.

Seventh Embodiment

Figure 17:
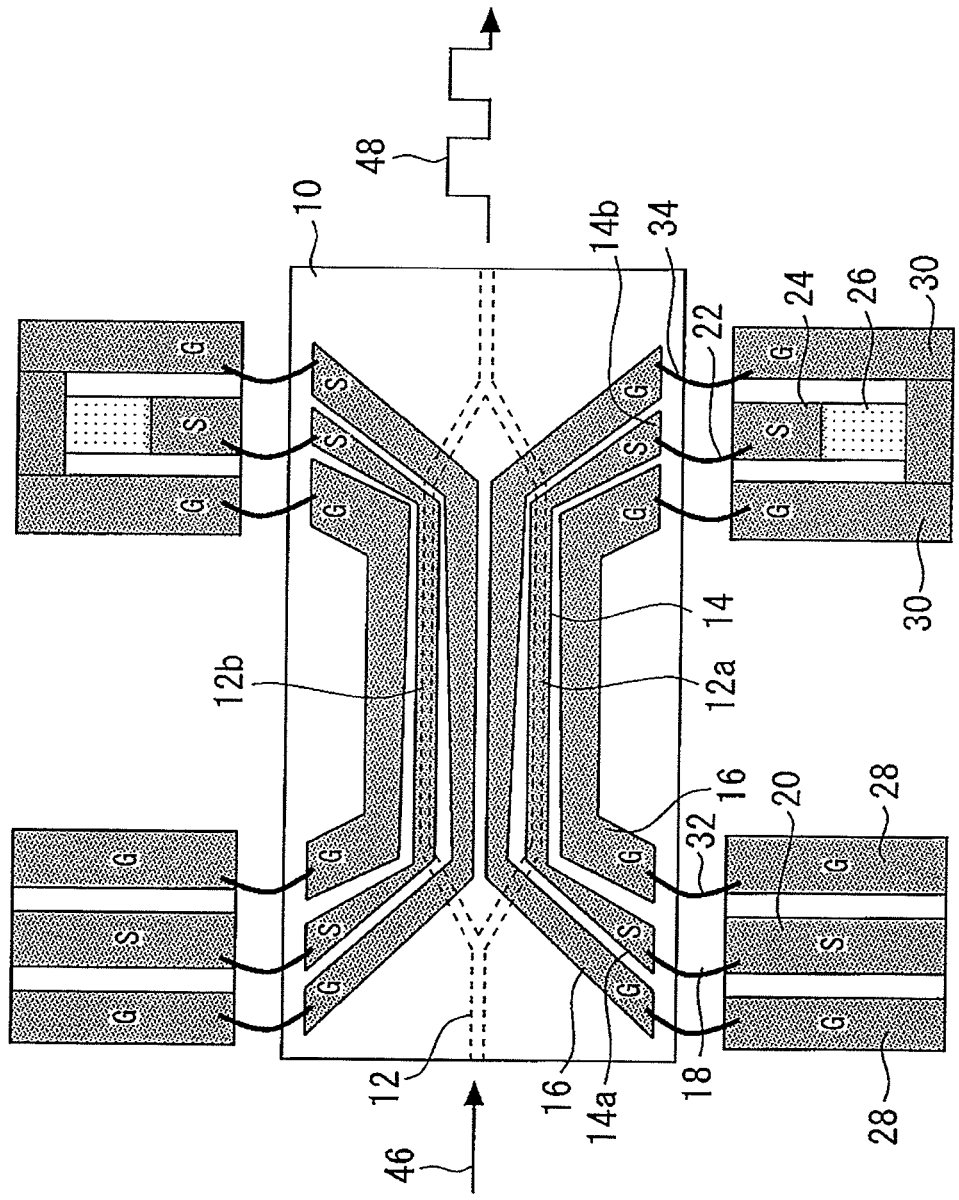
FIG. 17 is a top view showing an optical modulator according to the seventh embodiment.

FIG. 17 is a top view showing an optical modulator according to the seventh embodiment. The distance between the output portion 14b and the ground line 16 is smaller than the distance between the input portion 14a and the ground line 16. Thereby, the electric capacity between the output portion 14b and the grounding point becomes higher than the electric capacity between the input portion 14a and the grounding point. As a result, in the same manner as in the first embodiment, the modulation bandwidth can be sufficiently expanded.

Eighth Embodiment

Figure 18:
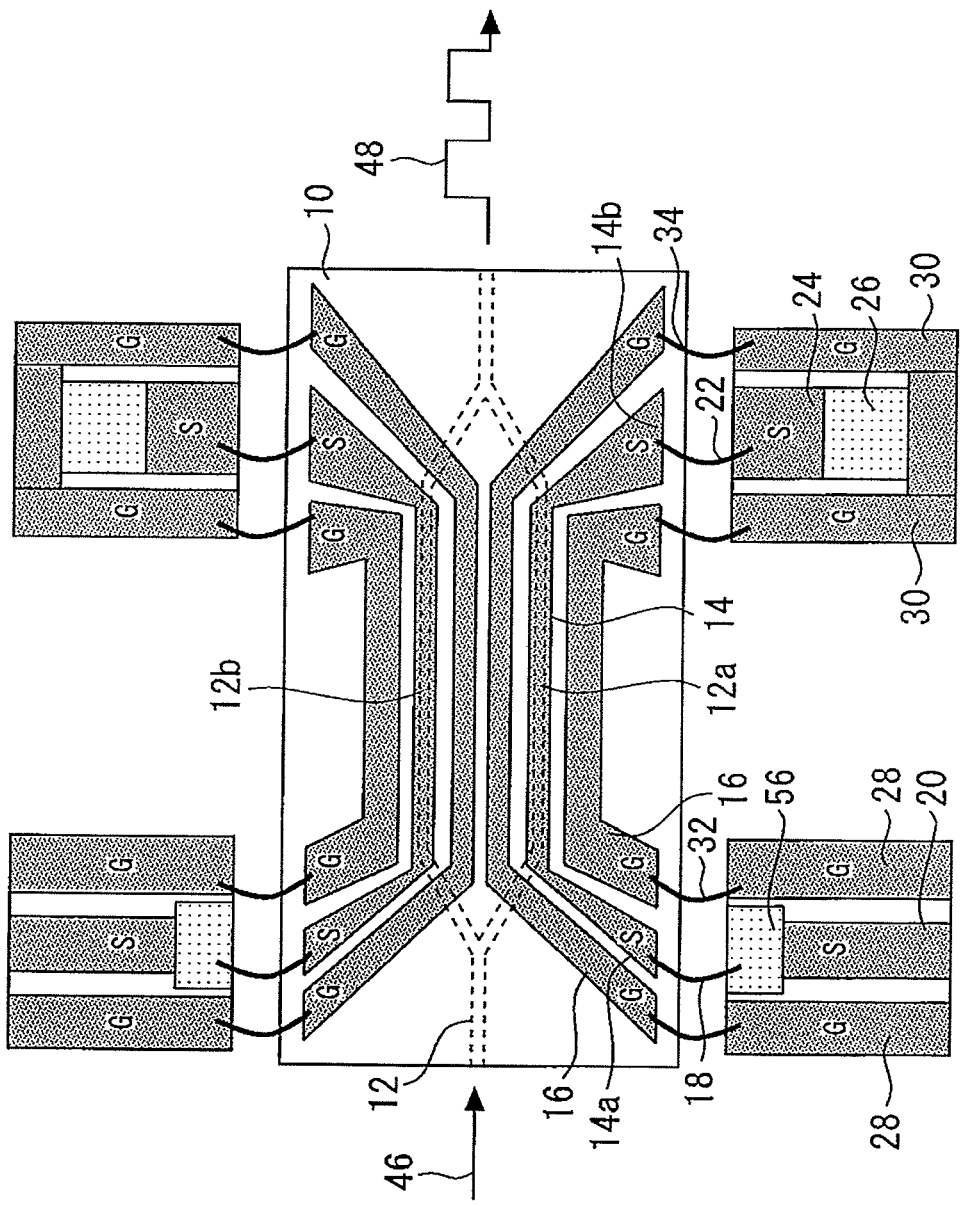
FIG. 18 is a top view showing an optical modulator according to the eighth embodiment.

FIG. 18 is a top view showing an optical modulator according to the eighth embodiment. Since the impedance of the waveguide 12 is low, electro-reflection occurs in the first wire 18 connecting the traveling wave electrode 14 and the power supply line 20. Therefore in the present embodiment, a second stub 56 connected to the end of the power supply line 20. The second stub 56 functions as a capacity and cancel the inductance components of the first wire 18. Thereby, the electro-reflection in the first wire 18 is reduced.

In the above-described first to eighth embodiments, the present invention was described when the present invention was applied to a traveling wave Mach-Zehnder optical modulator. However, the present invention is not limited thereto, but can be also applied to the traveling wave electro-absorption modulator to achieve a similar effect.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2010-226707, filed on Oct. 6, 2010, including the specification, claims, drawings, and summary, on which the Convention priority of the present application is based, is incorporated herein by reference in its entirety.

What is claimed is:

1. A Mach-Zehnder optical modulator comprising:
   a semiconductor chip;
   a waveguide in the semiconductor chip, wherein the waveguide has an impedance;
   a traveling wave electrode, including an input portion and an output portion, to which a signal is applied for modulating light passing through the waveguide;
   first and second wires:
   a power supply line having an impedance and connected to the input portion via the first wire; and
   a termination resistor having a resistance and connected to the output portion via the second wire, wherein
   capacitance between the output portion and a grounding point is larger than capacitance between the input portion and the grounding point,
   the impedance of the power supply line is larger than the impedance of the waveguide,
   the impedance of the waveguide is larger than the resistance of the termination resistor, and
   $Zwg \approx (Zin+Ro)/2$, where $Zwg$ is the impedance of the waveguide, $Zin$ is the impedance of the power supply line, and $Ro$ is the resistance of the termination resistor.

2. The Mach-Zehnder optical modulator according to claim 1, wherein the output portion is larger in area than the input portion.

3. The Mach-Zehnder optical modulator according to claim 1, further comprising a stub connected to the output portion.

4. The Mach-Zehnder optical modulator according to claim 1, further comprising first and second insulating films on the semiconductor chip, wherein
   the input portion is on the first insulating film,
   the output portion is on the second insulating film, and
   the second insulating film is thinner than the first insulating film.

5. The Mach-Zehnder optical modulator according to claim 1, further comprising a grounded ground line spaced from and located proximate the travelingwave electrode, on the semiconductor chip, wherein
   the output portion and the ground line are separated by a first distance,
   the input portion and the ground line are separated by a second distance, and
   the first distance is smaller than the second distance.

6. The Mach-Zehnder optical modulator according to claim 1, further comprising a stub connected to the power supply line.

* * * * *